United States Patent [19]

Taruya et al.

[11] Patent Number: 4,893,085

[45] Date of Patent: Jan. 9, 1990

[54] IGNITION MONITORING CIRCUIT FOR AN IGNITION SYSTEM OF AN INTERNAL COMBUSTION ENGINE INCLUDING AN ERRONEOUS PULSE ELIMINATING CIRCUIT MEANS

[75] Inventors: Masaaki Taruya; Kiyoshi Ookawa, both of Himeji, Japan

[73] Assignee: Mitsubishi Denki Kabushiki Kaisha, Tokyo, Japan

[21] Appl. No.: 317,484

[22] Filed: Mar. 1, 1989

[30] Foreign Application Priority Data

Mar. 18, 1988 [JP] Japan .................................. 63-63423

[51] Int. Cl.[4] .......................... F02P 17/00; G01P 3/42

[52] U.S. Cl. ...................................... 324/378; 324/380; 324/392; 324/160; 324/166

[58] Field of Search ............... 324/378, 380, 382, 391, 324/392, 160, 161, 166, 169; 307/246; 328/165; 361/29

[56] References Cited

U.S. PATENT DOCUMENTS 3,706,035 12/1972 Hoehn ............................. 324/166 X
3,970,872 7/1976 Kuhn et al. ...................... 324/378 X
4,000,456 12/1976 Johnston et al. .................... 324/382
4,575,677 3/1986 Dennis ................................ 324/161
4,680,721 7/1987 Pluddemann ................... 324/160 X

FOREIGN PATENT DOCUMENTS 58-90376 6/1983 Japan .
61-58974 3/1986 Japan .

*Primary Examiner*—Reinhard J. Eisenzopf
*Assistant Examiner*—Jack B. Harvey
*Attorney, Agent, or Firm*—Sughrue, Mion, Zinn, Macpeak & Seas

[57] ABSTRACT

An ignition monitoring circuit for an ignition system of an internal combustion engine of an automobile, which comprises, in addition to a pulse height and a pulse width shaper circuit, a circuit for eliminating an initial erroneous pulse which is generated from the pulse width shaper circuit upon making of the key switch. The pulse height shaper circuit shapes impulses corresponding to an ignition voltage into pulses of predetermined height; the pulse width shaper circuit shapes the output pulses of the pulse height shaper circuit into pulses of predetermined width. The eliminating circuit comprises: a serial circuit of a resistor, a diode, and a capacitor, coupled across the battery; and a transistor, having its base coupled to the output terminal of the pulse height shaper circuit through an inverter, which is coupled in parallel with the serial connection of the diode and the capacitor. The transistor is turned off to charge the capacitor and supply a voltage to the output terminal of the pulse width shaper circuit, in response to an output pulse of the pulse height shaper circuit. An output pulse of the pulse width shaper circuit not corresponding to any output pulse of the pulse height shaper circuit is eliminated by the capacitor of the eliminating circuit.

6 Claims, 3 Drawing Sheets

IGNITION MONITORING CIRCUIT FOR AN IGNITION SYSTEM OF AN INTERNAL COMBUSTION ENGINE INCLUDING AN ERRONEOUS PULSE ELIMINATING CIRCUIT MEANS

BACKGROUND OF THE INVENTION

1. Field of the Invention

This invention relates to an ignition monitoring circuit for an ignition system of an internal combustion engine of an automobile, etc.; more particularly, it relates to such an ignition monitoring circuit which outputs pulses of a fixed width when an ignition voltage is detected.

2. Description of the Related Art

Internal combustion engines operating on the Otto cycle, such as those used in automobiles, comprise an electrical ignition system. In the control of such internal combustion engines, the ignition voltages are detected by a ignition monitoring circuit (i.e. ignition signal detecting circuit), so that, for example, the supply of fuel may be stopped by the engine control unit when the ignition system is in failure. Such ignition monitoring circuits are generally required to output pulses of fixed width corresponding to the ignition voltages. In the case of widely-used conventional ignition monitoring circuits, however, there is a tendency that an erroneous pulse which does not correspond to any ignition voltage is outputted at the outset, when the key switch is made to connect the voltage source battery to the ignition system.

FIG. 1 is a circuit diagram showing the organization of such a conventional ignition monitoring circuit for an ignition system of an engine of an automobile.

The ignition system A, coupled to the battery 1 supplying the source voltage $V_1$ through a key switch 2, comprises an ignition coil 3 and an ignition plug 4 coupled to the secondary winding of the ignition coil 3. The central processing unit (CPU), or more precisely a microcomputer, 5 outputs control signals to the power transistor driving circuit 6. The driving circuit 6 turns on and off the Darlington pair 7 consisting of a first and a second (i.e. power) transistor, *7a* and *7b*, to turn on and off the current through the primary winding of the ignition coil 3 coupled in series therewith, so that a high voltage may be induced across the gap in the ignition plug 4. The output of the driving circuit 6 is coupled to the base of the first transistor *7a* of the Darlington pair to control the turning on and off thereof; the emitter of the first transistor *7a* is coupled to the base of the power transistor *7b*; and the collectors of the transistors *7a* and *7b* are coupled to a terminal of the primary winding of the ignition coil 3. Thus, the power transistor *7b* is turned on and off in phase with the first transistor *7a*.

The conventional ignition monitoring circuit comprises following portions: a pulse shaper circuit portion B coupled to the collector of the power transistor *7b*, an RC circuit portion C of predetermined fixed rise time, a comparator circuit portion D, and an output circuit 20.

The pulse shaper circuit portion B, which detects the impulse voltages at the primary winding of the ignition coil 3 corresponding to the ignition voltages and shapes them into rectangular pulses of predetermined height, has the following organization. A voltage divider consisting of a serially connected resistors 8 and 9 is coupled across the point a at the collector of the power transistor *7b* and the ground. A capacitor 11 and a Zener diode 12 in parallel circuit relationship are coupled across the junction between the resistors 8 and 9 and the ground through a rectifier diode 10 having the forward direction away from the junction between the resistors 8 and 9, wherein the positive electrode of the Zener diode 12 is directed toward the ground. Thus, the clamping Zener diode 12 limits the voltage at the junction between the resistors 8 and 9 under a predetermined level, i.e. the Zener voltage thereof. Further, a voltage divider consisting of serially connected resistors 13 and 14 is coupled across the negative electrode of the Zener diode 12 and the ground, whereby the junction between the resistors 13 and 14 constitutes the output point b of the circuit portion B. Thus, the pulse shaper circuit portion B shapes the impulses occurring at point a upon turning off the power transistor 7b into pulses of predetermined height.

The circuit portions C and D constitute together a constant timer circuit, i.e. a circuit for shaping output pulses of portion B into pulses of a fixed width. The circuit portion C comprises an RC circuit consisting of a serial connection of a resistor 16 and a capacitor 17 coupled across the battery 1 through the key switch 2. Further, a third transistor 15 having a base coupled to the output point b of the portion B is coupled across the capacitor 17 at the collector and the emitter thereof. The transistor 15 is turned on only when impulse voltages at the primary side of the ignition coil is detected, i.e. only when pulses are outputted from the pulse shaper circuit portion b at point b. The comparator circuit portion D, on the other hand, comprises a comparator circuit 18 having an inverting input coupled to the junction point c between the resistor 16 and capacitor 17 of the circuit portion C. The non-inverting input of the comparator circuit 18 is coupled to a constant voltage source $V_2$ supplying a standard positive voltage thereto. The output of the comparator circuit 18, on the other hand, is coupled to the output circuit 20 through a resistor 19.

FIG. 2 shows the waveforms of the voltage Vi at point i supplying the battery voltage to the circuit portions A and C, and the waveforms of the voltages Va through Vd at points a through d, respectively, in the circuit portions A through D described above.

As shown at the top row (I) in FIG. 2, the voltage Vi at point i, coupled to the ignition coil 3 of the ignition system A and the resistor 16 of the portion C, rises abruptly from the ground to the battery voltage level $V_1$ when the key switch 2 is made. After a length of time, when the driving circuit 6 starts to turn on and off the Darlington pair 7 at the commands of the microprocessor 5, high ignition voltages are induced in the secondary winding of the coil 3, so that impulse voltages are successively generated at the point a in the ignition system A, as shown by the waveform Va at second row (A). The clamping Zener diode 12, limiting the voltage at its negative electrode under the Zener voltage thereof, shapes the waveform Va at point a into a waveform Vb at point b consisting of rectangular pulses, with the help of resistors 8 and 9, rectifier diode 10, capacitor 11, and resistors 13 and 14.

On the other hand, the voltage Vc at the junction c between the resistor 16 and capacitor 17 rises from the ground to the battery voltage level $V_1$ when the key switch 2 is made, as shown in solid line at the fourth row (C) in FIG. 2, since the transistor 15 is turned off at that time. Thereafter, each time a pulse of the waveform Vb is outputted from the circuit portion B, the transistor 15 is turned on to reduce the voltage Vc at junction point c to the ground level; the voltage Vc rises each time to the battery voltage level $V_1$ with a fixed time constant determined by the resistance R of the resistor 16 and and capacitance C of the capacitor 17. On the other hand, a constant standard voltage shown by a dot and dash line $V_2$ at the fourth row (C) in FIG. 2 is applied to the non-inverting input of the comparator circuit 18 when the key switch 2 is made, and the comparator 18 compares the waveform Vc with the standard voltage $V_2$. Thus, the comparator circuit 18 outputs a pulse of a fixed width to the output circuit 20 through resistor 19 when the standard voltage $V_2$ is greater than the voltage Vc (i.e. when the comparator circuit 18 is turned off). The voltage waveform Vd at point d, therefore, takes the form shown at the bottom row (D) in the figure.

Thus, the voltage waveform Vd consists of pulses of a fixed width each of which corresponds to an ignition voltage, except for the first pulse d1; the initial pulse d1, which is generated when the key switch 2 is made, does not correspond to any ignition voltage. Consequently, the conventional ignition monitoring circuit of FIG. 1 has the problem that an ignition signal is erroneously detected when the key switch is made to start the engine.

SUMMARY OF THE INVENTION

It is the primary object of this invention therefore to provide an ignition monitoring circuit for an ignition system of an internal combustion engine which is capable of detecting ignition voltages accurately and reliably, and does not produce an erroneous pulse that does not correspond to an ignition voltage; more particularly, this invention aims at providing an ignition monitoring circuit which does not output an erroneous pulse when the key switch is made to start the engine.

It is an additional object of this invention to provide such an ignition monitoring circuit which is simple in organization and reliable in operation.

The above objects are accomplished in accordance with the principles of this invention in a ignition monitoring circuit comprising an erroneous pulse eliminating circuit means in addition to the elements described above. Namely, the circuit according to this invention comprises: pulse height shaper circuit means (e.g. the circuit portion B) for shaping impulse voltages at a terminal of the primary winding of the ignition coil, each corresponding to an ignition voltage, into pulses of predetermined height; a pulse width shaper circuit means (e.g. the circuit portions C and D together) for converting the output pulses of the pulse height shaper circuit into pulses of a fixed width; and an erroneous pulse eliminating circuit means for eliminating any output pulse of the pulse width shaper circuit which does not correspond to an output pulse of the pulse height shaper circuit. The eliminating circuit has an input coupled to the output of the pulse height shaper circuit, and is supplied with a voltage from a battery; the eliminating circuit supplies the battery voltage to the output of the pulse width shaper circuit in response to an output pulse of the pulse height shaper circuit, thereby sustaining the output pulses of the second pulse shaper circuit which do correspond to the output pulses of the pulse height shaper circuit means. Thus, the output pulses of the ignition monitoring circuit of this invention all correspond to an ignition voltage.

In a preferred embodiment, the erroneous pulse eliminating circuit means comprises a serial circuit of a resistor, a rectifier diode, and a capacitor, coupled across the battery supplying voltage to the ignition system, the forward direction of the diode agreeing with the direction from the positive to the negative terminal of the battery, wherein the junction between the diode and the capacitor is coupled to the output terminal of the pulse width shaper circuit means; further, a transistor, having its base coupled to the output terminal of the pulse height shaper circuit means through an inverter which inverts the polarity of the pulses outputted from the pulse height shaper circuit means, is coupled in parallel circuit relationship with the serial connection of the diode and the capacitor. When output pulses are generated from the pulse height shaper circuit means to turn off the transistor having its base coupled to the inverter, the battery voltage rapidly charges the capacitor and is supplied to the output terminal of the pulse width shaper circuit means. When, on the other hand, none of output pulses of the pulse height shaper circuit means is present, the transistor is turned on by the output of the inverter; thus, the capacitor eliminates any erroneous output pulse of the pulse width shaper circuit means which does not correspond to an ignition voltage.

BRIEF DESCRIPTION OF THE DRAWINGS

The novel features which are believed to be characteristic of this invention are set forth with particularity in the appended claims; this invention itself, however, both as to its organization and method of operation, may be best understood from the following detailed description of the preferred embodiments, taken in conjunction with the accompanying drawings, in which:

In the drawings, like reference numerals and characters represent like or corresponding parts or portions.

DETAILED DESCRIPTION OF THE PREFERRED EMBODIMENT

Figure 4:
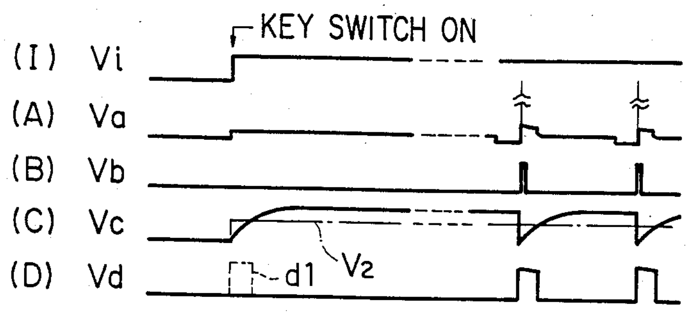
FIG. 4 is a diagram showing the waveforms of the voltages Vi and Va through Vd at points i and a through d, respectively, in the circuit of FIG. 3.
Figure 3:
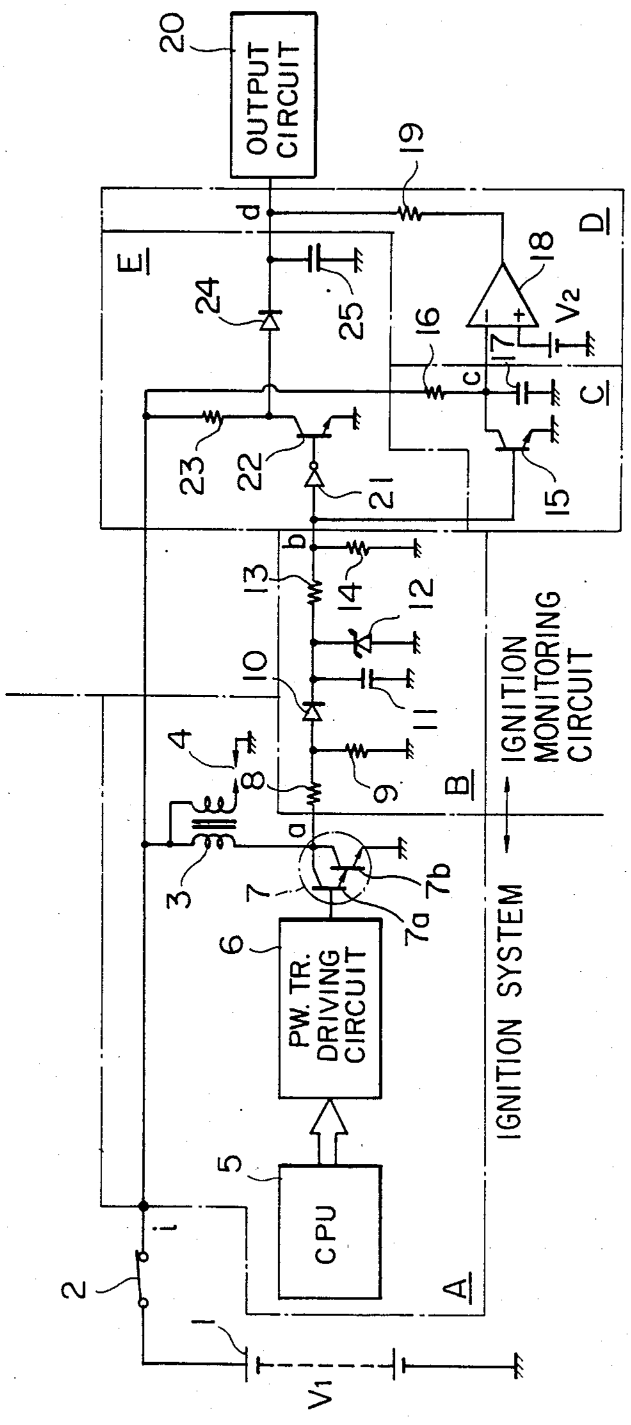
FIG. 3 is a circuit diagram showing the organization of an ignition monitoring circuit for an ignition system of an internal combustion engine according to this invention.

Referring now to FIGS. 3 and 4 of the drawings, an embodiment according to this invention is described.

FIG. 3 is a circuit diagram showing the organization of an ignition monitoring circuit for an ignition system of an engine of an automobile according to this invention.

Figure 1:
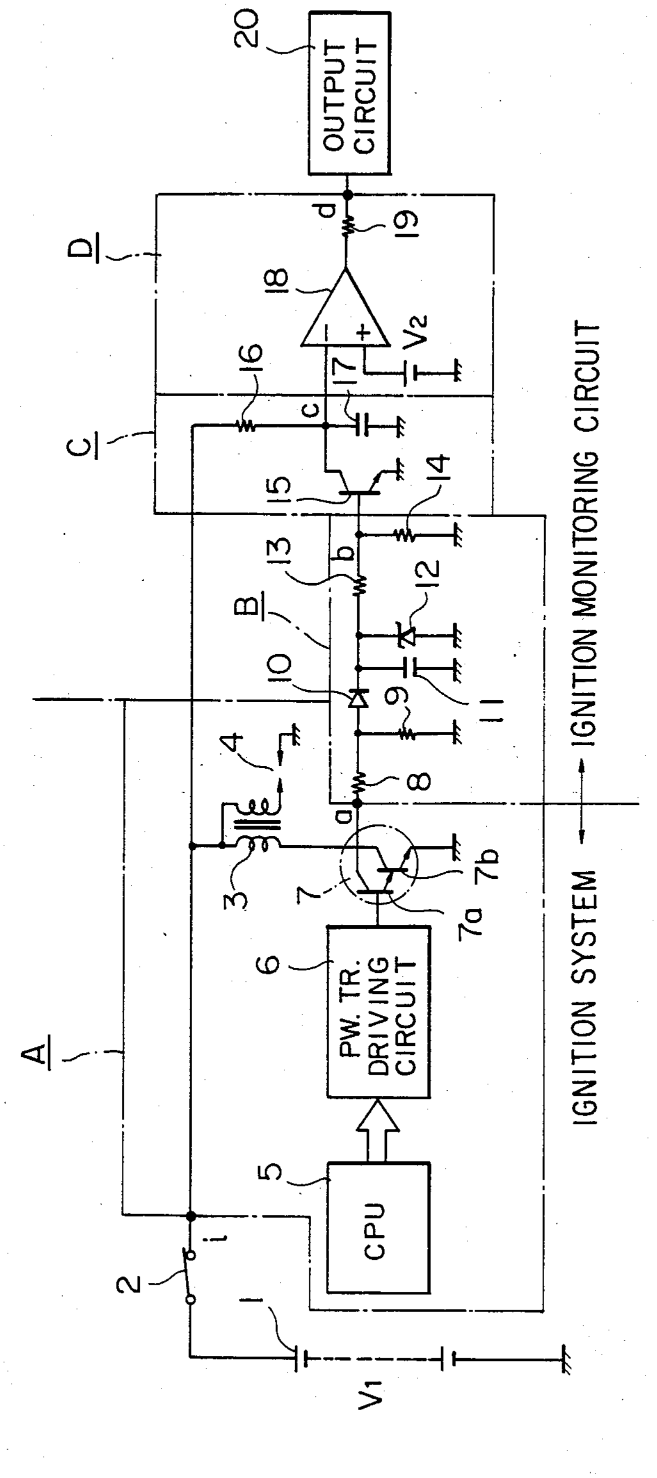
FIG. 1 is a circuit diagram showing the organization of a conventional ignition monitoring circuit for an ignition system of an internal combustion engine.
Figure 2:
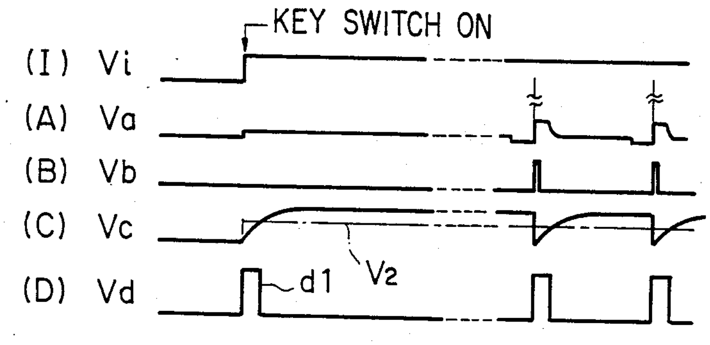
FIG. 2 is a diagram showing the waveforms of the voltages Vi and va through Vd at points i and a through d, respectively, in the circuit of FIG. 1.

An ignition system A, coupled to the battery 1 supplying the source voltage V1 through a key switch 2, has an organization similar to that of the ignition system shown in FIG. 1; thus, it comprises an ignition coil 3 having a primary and secondary winding, an ignition plug 4, a microcomputer 5, a power transistor driving circuit 6, and a Darlington pair 7 consisting of a driving transistor *7a* and a power transistor *7b*, wherein like reference numerals represent like parts. Thus, the description of the organization of the ignition system A is not repeated here.

An ignition monitoring circuit according to this invention, on the other hand, comprises following portions: a pulse shaper circuit portion B, coupled to the collector of the power transistor *7b* of the ignition system A, for shaping the impulse voltages, occurring at the turning off of the power transistor *7b*, into rectangular pulses of a predetermined height, which impulse voltages corresponding to the ignition voltages across the ignition plug 4; an RC circuit portion C comprising a serial connection of a resistor 16 and a capacitor 17 coupled across the battery 1 through the key switch 2, and a transistor 15 for discharging the capacitor 17 in response to a plus output of the pulse shaper circuit portion B; a comparator circuit portion D including a comparator circuit 18 for comparing the voltage across the capacitor 17 of the RC circuit portion C with a standard positive voltage $V_2$; a voltage supply circuit portion E for supplying a voltage to the output of the circuit portion D only when a pulse is supplied from the pulse shaper circuit portion C, wherein the portion E otherwise absorbs voltages at the output of the circuit portion D, and thereby eliminates erroneous output pulses of circuit D not corresponding to any output pulse of circuit portion B; and an output circuit 20. Of the above portions of the ignition monitoring circuit, the portion B constitutes the first pulse shaper, or the pulse height shaper, circuit means; portions C and D together constitute the second pulse shaper, or the pulse width shaper circuit means; and portion E constitute the erroneous pulse eliminating circuit means according to this invention.

The pulse shaper circuit portion B, the RC circuit portion C of constant rise time, the comparator circuit portion D, and the output circuit 20, of the ignition monitoring circuit according to this invention, have organizations and operations similar to those of the corresponding circuit portions B through D and output circuit 20, respectively, of the monitoring circuit shown in FIG. 1, like reference numerals designating like elements. Thus, their description is not repeated here. On the other hand, the organization and operation of the circuit portion E is as follows:

The inverter 21 of circuit portion E, having an input coupled to the output point b of the pulse shaper circuit portion B, inverts the polarity of the waveform Vb. Namely, the output of the inverter 21 is at a high level when the waveform Vb is at the ground level; it is at the ground level when the waveform Vb is at the high level, i.e. during the time in which a pulse of the waveform Vb is generated. The output of inverter 21 is coupled to the base of a transistor 22, having a grounded emitter and a collector coupled to the key switch 2 through a resistor 23; further, the collector of transistor 22, i.e. the junction between the serial connection of transistor 22 and resistor 23, is coupled to point d through a rectifier diode 24 having a forward direction directed toward the point d. A capacitor 25 is coupled across the point d and the ground.

The transistor 22 is turned on when the output of the inverter 21 is high, i.e. when the waveform Vb is at the ground level; it is turned off when the output of the inverter is at the ground level, i.e. when one of the pulses of the waveform Vb is generated. The voltage at the collector of the transistor 22 falls substantially to the ground level when transistor 22 is turned on; it rises rapidly when transistor is turned off, thereby charging the capacitor 25 through the rectifier diode 24. Thus, the capacitor 25 is charged by the battery voltage $V_1$ through the resistor 23 and diode 24, and supplies a voltage to the output point d of the circuit portion D and sustains at point d the height of the pulses outputted from the comparator 18, in the case where an output pulse is generated at point b of pulse shaper circuit portion B. The capacitor 25 is quickly discharged through resistor 19 after the output of the comparator 18 falls to the ground level. thus, pulses outputted from the comparator 18 when no pulse is generated at point b (i.e. when no ignition voltage is detected) are substantially eliminated by the capacitor 25.

The operation of the ignition system A and the circuit portions B through E when the key switch 2 is made is as follows:

When the key switch 2 is made, the voltage Vi at point i, coupled to the ignition coil 3 of the ignition system A and to the resistors 16 and 23 of the circuit portions C and E, respectively, rises abruptly from the ground to the battery voltage level $V_1$, as shown at the top row (I) in FIG. 4. At the same time, the voltage Va at point a at the collector of the power transistor *7b* in the ignition system A also rises to a voltage level substantially equal to the battery voltage $V_1$; however, the voltage waveform Vb at the output point b of the circuit portion B remains substantially at the ground level, since the voltage $V_1$ is extremely small compared with the impulse voltages occurring at the turning off of the power transistor *7b* at collector thereof. Thus, the transistor 15 of the RC circuit portion C remains turned off at this time; the capacitor 17 therefore is charged through resistor 16 by the battery voltage $V_1$, as shown at the fourth row (C) in FIG. 4. At the same time, the comparator 18 begins to be supplied with the standard voltage $V_2$, as shown by a dot and dash line at the same row (C), when the key switch 2 is made. Thus, the comparator circuit 18 outputs an erroneous initial pulse d1 not corresponding to any output pulse of the portion B, when the key switch 2 is made, as shown by dotted line at the bottom row (D) in FIG. 4. The erroneous initial pulse d1, however, is eliminated from the output voltage Vd of the circuit portion D by the operation of the circuit portion E, as described in the following.

Since the transistor 22 is turned on until the first pulse of the waveform Vb corresponding to the first ignition voltage occurs, the capacitor 25 is not charged during the same period and the voltage across the capacitor 25 remains substantially zero. Thus, the initial erroneous pulse d1, which is outputted from the comparator circuit 18 when the key switch 2 is made, is substantially eliminated in charging the capacitor 25.

The above is the description of the operation of the ignition monitoring circuit of this invention when the key switch is made. The operation of the ignition system A and the circuit portions B through E during the time in which ignition voltages are induced across the ignition plug 4 is as follows:

After a length of time, when the driving circuit 6 starts to turn on and off the Darlington pair 7 at the commands of the microprocessor 5, high ignition voltages are induced in the secondary winding of the coil 3; at the same time, impulse voltages corresponding to ignition voltages are successively generated at the point a at the collector of the power transistor *7b* coupled in series with the primary winding of the ignition coil 3 in the ignition system A, as shown by the waveform Va at second row (A). The clamping Zener diode 12 of the pulse shaper circuit portion B, limiting the voltage at its negative electrode under the Zener voltage thereof, shapes the waveform Va at point a into a pulse train Vb at point b consisting of rectangular pulses of a predetermined height, with the help of resistors 8 and 9, rectifier diode 10, capacitor 11, and resistors 13 and 14. Further, each time a pulse of the waveform Vb is outputted from the circuit portion B, the transistor 15 is turned on to reduce the voltage Vc at junction point c to the ground level; the voltage Vc rises each time to the battery voltage level $V_1$ with a fixed time constant determined by the resistance R of the resistor 16 and capacitance C of the capacitor 17. On the other hand, a constant standard voltage shown by a dot and dash line $V_2$ at the fourth row (C) in FIG. 4 is applied to the non-inverting input of the comparator circuit 18 when the key switch 2 is made, and the comparator 18 compares the waveform Vc with the standard voltage $V_2$. Thus, the comparator circuit 18 outputs a pulse of a fixed width when the standard voltage $V_2$ is greater than the voltage Vc (i.e. when the comparator circuit 18 is turned off). The output pulses of the comparator circuit 18 which corresponds to output pulses of the pulse shaper circuit portion B, namely, those pulses of the comparator circuit 18 which correctly detects ignition voltages, are sustained at point d by the voltage supplied from the circuit portion E as follows.

Namely, the capacitor 25 is rapidly charged by the battery 1 through the resistor 23 and diode 24 during the interval of time in which one of the pulses of the waveform Vb is generated; consequently, the output pulses of the comparator circuit 18 other than the first one, i.e. those corresponding to one of the pulses of the waveform Vb, are maintained by the voltage across the charged capacitor 25. After the output voltage level of the comparator circuit 18 falls to the ground level (i.e. the output of the comparator 18 is turned on), the capacitor 25 is discharged through the resistor 19. As a result, the voltage waveform Vd at point d has the form shown by a solid line at the bottom row (D) in FIG. 4, which consists of pulses of a fixed width each corresponding to a pulse of output voltage Vb of the voltage shaper circuit portion B. The voltage waveform Vd is supplied to the output circuit 20 to be outputted therefrom as the ignition detecting signal.

As described above, thanks to the provision of the erroneous pulse eliminating circuit means (i.e. the voltage supply circuit portion E) according to this invention, the output pulses of the pulse width shaper circuit means (i.e. the output pulses of the comparator circuit portion D) all accurately correspond to an ignition voltage.

While description has been made of the particular embodiment according to this invention, it will be understood that many modification may be resorted to without departing from the spirit thereof; the appended claims are contemplated to cover any such modifications as fall within the true spirit and scope of this invention.

What is claimed is:

1. An ignition monitoring circuit for an ignition system of an internal combustion engine, comprising:

first pulse shaper circuit means, coupled to a terminal of a primary winding of an ignition coil of the ignition system, for shaping voltage impulses, occurring at the terminal of the primary winding of the ignition coil upon production of ignition voltages, into pulses of a predetermined height;

second pulse shaper circuit means, coupled to an output of said first pulse shaper circuit means, for converting said pulses outputted from said first pulse shaper means into pulses of a fixed predetermined width; and erroneous pulse eliminating circuit means, having an input coupled to the output of the first pulse shaper circuit means and supplied with a voltage from a battery, for eliminating an output pulse of said second pulse shaper means not corresponding to any output pulse of said first pulse shaper means, said erroneous pulse eliminating circuit means sustaining output pulses of said second pulse shaper circuit means corresponding to output pulses of said first pulse shaper means, by supplying the voltage from the battery to an output terminal of said second pulse shaper means in response to output pulses of said first pulse shaper circuit means.

2. An ignition monitoring circuit for an ignition system of an internal combustion engine as claimed in claim 1, wherein said erroneous pulse eliminating circuit means comprises:

a serial circuit of a resistor, a rectifier diode, and a capacitor, coupled across a positive and a negative terminal of said battery, a forward direction of said rectifier diode being directed from the positive to the negative terminal of said battery, wherein a junction between said capacitor and said rectifier diode is coupled to the output terminal of said second pulse shaper circuit means;

a transistor coupled across a serial connection of said rectifier diode and said capacitor of said serial circuit to be in parallel circuit relationship therewith; and an inverter having an input coupled to the output terminal of said first pulse shaper circuit means, an output terminal of said inverter being coupled to a base of said transistor of said serial circuit, wherein said transistor is turned on when none of said output pulses of first pulse shaper circuit means is generated, and said transistor is turned off when one of said output pulses of first pulse shaper circuit means is generated, thereby supplying the battery voltage across the capacitor.

3. An ignition monitoring circuit for an ignition system of an internal combustion engine as claimed in claim 1 or 2, wherein said second pulse shaper circuit means comprises:

an RC circuit consisting of a serial connection of a resistor and a capacitor coupled across a battery;

a transistor, coupled across said capacitor of said RC circuit to be in parallel circuit relationship therewith, having a base coupled to the output of said first pulse shaper circuit means, wherein said transistor of second pulse shaper circuit means is turned on in response to output pulses of said first pulse shaper circuit means; and a comparator means, having a pair of inputs coupled to a standard voltage source and a junction point between said resistor and capacitor of said RC circuit, respectively, for comparing a voltage at the junction point between said resistor and capacitor of the RC circuit with a standard voltage supplied from said standard voltage source, said comparator means outputting a voltage when the voltage at said junction exceeds said standard voltage.

4. An ignition monitoring circuit for an ignition system of an internal combustion engine as claimed in claim 3, wherein said second pulse shaper circuit means further comprises a resistor inserted between an output of said comparator means and the output terminal of said second pulse shaper circuit means.

5. An ignition monitoring circuit for an ignition system of an internal combustion engine as claimed in claim 1, further comprising an output circuit means, coupled to the output of said second pulse shaper circuit means, for outputting pulses corresponding to output pulses of said second pulse shaper circuit means.

6. An ignition monitoring circuit for an ignition system of an internal combustion engine as claimed in claim 1, wherein said first pulse shaper circuit means comprises a clamping Zener diode coupled across a power transistor of the ignition system turning on and off a current through the primary winding of the ignition coil, wherein said Zener diode has a forward direction opposite to a forward direction of said power transistor, thereby limiting a voltage thereacross in a reverse direction under a Zener voltage thereof.

* * * * *